United States Patent

[11] 3,578,960

[72] Inventors Heinz W. Georgi
San Diego;
Roy E. Nather, Solana Beach, Calif.
[21] Appl. No. 540,609
[22] Filed Apr. 6, 1966
[45] Patented May 18, 1971
[73] Assignee Beckman Instruments, Inc

[54] RADIATION DETECTION SYSTEM WITH AUTOMATIC SAMPLE COUNTING RATE DETERMINATION
11 Claims, 7 Drawing Figs.

[52] U.S. Cl. 235/156, 250/83.3, 235/92
[51] Int. Cl. G06f 7/39, G01t 1/16
[50] Field of Search 235/156, 92 (T), (F), 50; 324/78 (D); 250/83.3

[56] References Cited
UNITED STATES PATENTS
2,829,269 4/1958 Peacock et al. 250/83.3(X)
3,246,150 4/1966 Stoddart et al. 250/83.6(X)

*Primary Examiner*—Eugene G. Botz
*Attorneys*—Robert J. Steinmeyer and Paul R. Harder

ABSTRACT: A radiation detection system with automatic and continuous online computation of sample count rate is disclosed. Logic circuitry is provided by which count pulses are added to a X register and subtracted from a dividend register. A comparator circuit is provided to detect the condition of identical tally in the X register and a timer register. Upon comparison and tally coincidence of the X register with the timer register, a means to increment a quotient register is provided. Such incrementation is continued until the dividend register is reduced to zero as indicated by the negative detection circuit provided therefor. The quotient register thereby contains the number of times the timer register can be divided into the dividend register. Other circuitry is provided to transfer the counts from a sample radiation detector into the dividend register. Therefore, at the end of computation the quotient register contains the sample count rate desired. Further logic circuitry and a cycle phase counter circuit are provided to accomplish division in a time substantially less than the elapsed measurement time period. By this logic means the various registers are incremented or decremented, as the case may be, at higher decade levels in the register progressing to lower decade levels as the logic circuitry and cycle phase counter direct, thereby providing a short computational time approaching a continuous presentation of sample count rate. Automatic compensation for undesired background counts is provided by means of digital circuits for subtraction of such count from the quotient register.

| N | J | N+J | DR INPUT RELATIVE TO DECIMAL POINT | XR INPUT RELATIVE TO DECIMAL POINT | QR INPUT RELATIVE TO DECIMAL POINT |
|---|---|---|---|---|---|
| 1 | 0 | 1 | +3 | 0 | +3 |
| 1 | 1 | 2 | +1 | -2 | +3 |
| 2 | 0 | 2 | +1 | 0 | +1 |
| 2 | 1 | 3 | -1 END AROUND BORROW RIGHT SHIFT | -2 | +1 |
| 3 | 0 | 3 | -1 END AROUND BORROW RIGHT SHIFT | 0 | -1 |
| 3 | 1 | 4 | -3 END AROUND BORROW RIGHT SHIFT | -2 | -1 |

INVENTORS
HEINZ W. GEORGI
ROY E. NATHER
BY Fulwider, Patton, Rieber Lee, and Utecht
ATTORNEYS INVENTORS
HEINZ W. GEORGI
ROY E. NATHER
BY Lyon, Patton, Rieber, Lee, and Utecht
ATTORNEYS INVENTORS
HEINZ W. GEORGI
ROY E. NATHER
BY Fulwider, Patton, Rieber Lee, and Utecht
ATTORNEYS INVENTORS
HEINZ W. GEORGI
ROY E. NATHER
BY
Fulwider, Patton, Rieber,
Lee, and Utecht
ATTORNEYS INVENTOR.
HEINZ W. GEORGI
ROY E. NATHER
BY Fulwider, Patton, Rieber, Lee, and Utecht
ATTORNEYS

RADIATION DETECTION SYSTEM WITH AUTOMATIC SAMPLE COUNTING RATE DETERMINATION

This invention relates generally to radiation analysis systems, and more particularly to a new and improved radiation analysis system wherein sample counts per unit time interval are automatically and continuously computed and presented by the system to the system operator.

In the fields of nuclear physics and chemistry, it has been the general practice to employ various radiation analysis systems to determine radioactive characteristics of sample materials. Although such devices have generally served their purpose, they have not proven entirely satisfactory for a number of reasons. In this connection, the radiation analysis systems of the prior art usually measure sample counts for a predetermined period of time, and the actual sample count rate, i.e., sample counts per minute, cannot be determined until termination of the preset counting interval followed by an off-line computation wherein the total sample counts during the entire counting time interval are divided by that time interval. The latter procedure for determining sample counts per unit time interval is expensive, time consuming, and does not enable an accurate sample count rate analysis prior to a complete count over the preset time interval.

Hence, those concerned with the development and use of radiation analysis systems have long recognized the need for improved equipment which obviates the above and other disadvantages of the prior art systems. The present invention fulfills this need.

Accordingly, an object of the present invention is the provision of a new and improved radiation analysis system wherein sample counts per unit time interval are automatically computed and presented to the system operator.

Another object is to provide a new and improved radiation analysis system wherein sample counts per unit time interval are automatically computed on line and continuously revised to provide substantially live time presentation of sample count rate to the system operator.

A further object of this invention is the provision of the new and improved radiation analysis system which automatically computes and continuously presents sample count rates to the system operator while being nondestructive of absolute sample counts and time information within the analysis system.

Still another object is to provide a new and improved radiation analysis system wherein sample count rate is automatically computed and continuously presented by the system in a form which is automatically compensated for background count rate.

Yet another object of the present invention is the provision of a new and improved radiation analysis system wherein sample count rate is automatically computed utilizing a relatively inexpensive yet rapid division logic network.

The above and other objects and advantages of this invention will become apparent from the following description, when taken in conjunction with the accompanying drawings of illustrative embodiments thereof, and wherein.

Figure 5:
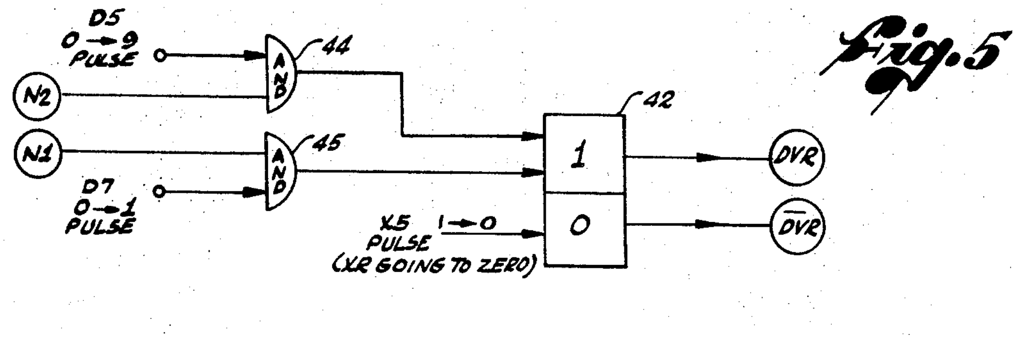
Figure 6:
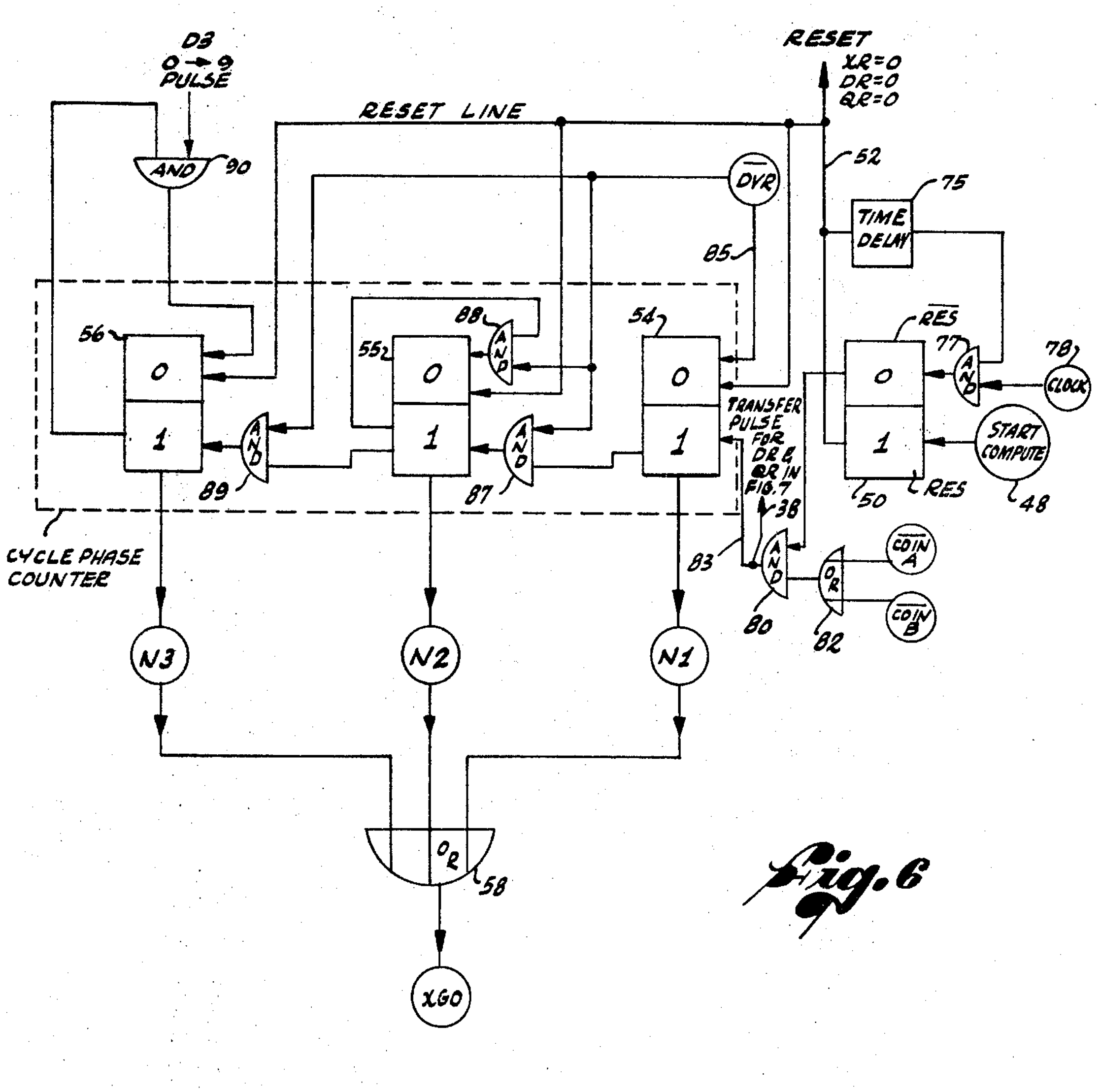
Figure 7:
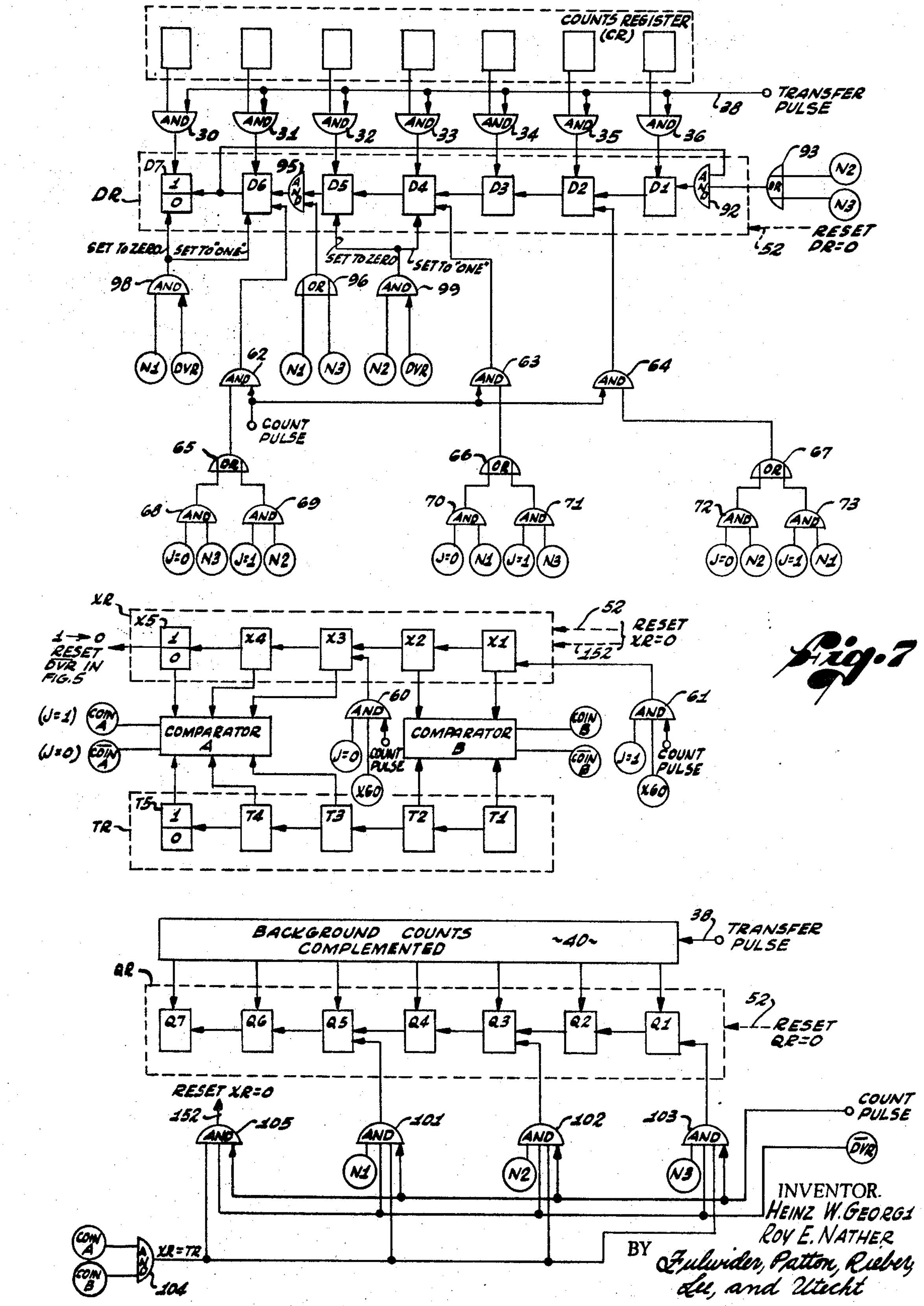

FIG. 5 and 6 are schematic logic diagrams of subsystems for generating various conditioning signals required in a presently preferred embodiment of the counts per unit time interval division network; and FIG. 7 is a schematic logic diagram of a presently preferred counts per unit time interval division network which utilizes the conditioning signals generated by the subsystems illustrated in FIGS. 5 and 6.

Figures 1, 3:
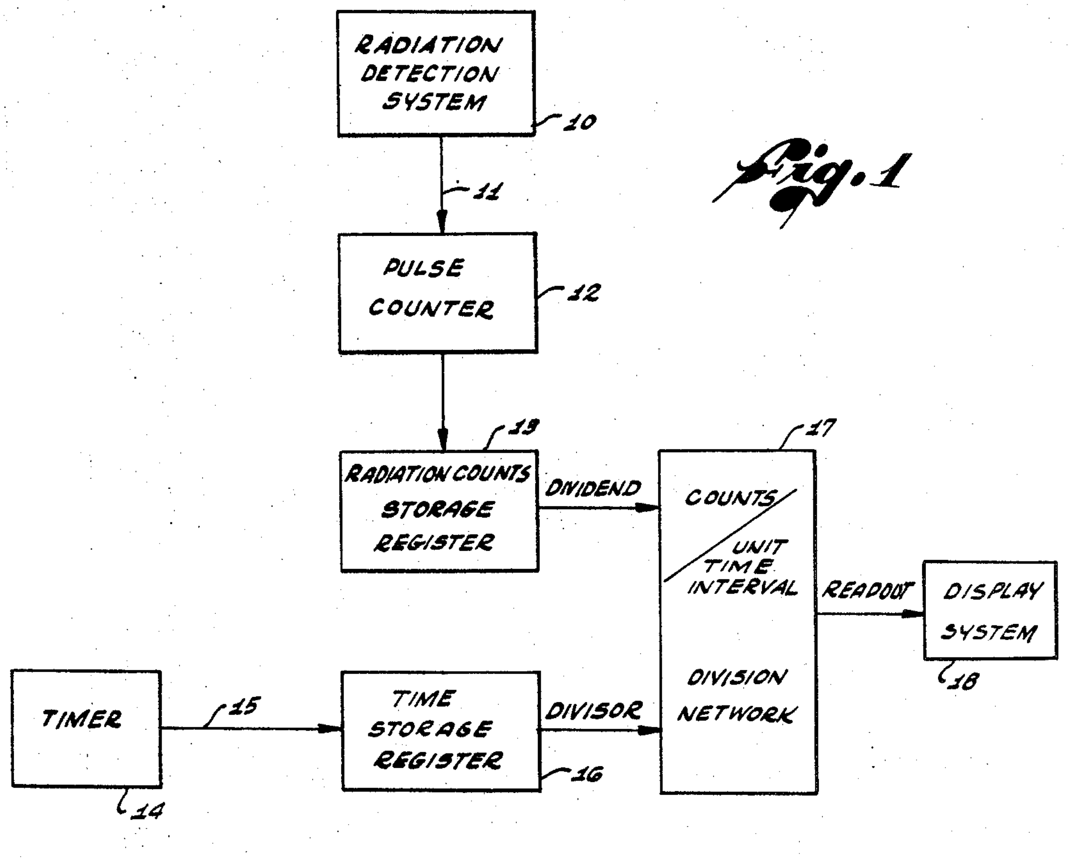
FIG. 1 is a block diagram of a generalized radiation analysis system for automatically computing and continuously displaying sample count rate in accordance with the present invention.
FIG. 3 is a table of counting pulse input locations for the various registers of the division network illustrated in FIG. 2.

Referring now to the drawings, and particularly to FIG. 1 thereof, there is shown a schematic representation of a basic radiation analysis system for automatically computing and continuously displaying count rates for a sample being analyzed, the computation and display being on line and being performed in substantially real time. In this connection, the computation is continuously carried out and revised by utilizing the radiation counts substantially as they are accumulated and utilizing the elapsed counting time interval as it increases, without in any way affecting the actual accumulated data in the radiation counts and time storage registers.

In the systems shown in FIG. 1, any appropriate radiation detection system 10 responds to decay events occuring in the sample being analyzed (not shown) and directs the detected counts over line 11 to a pulse counter 12 of any appropriate type well known in the art. Detected counts are accumulated in a radiation counts storage register 13.

Any appropriate timer 14, e.g., an electronic clock, directs time pulses over line 15 to a time storage register 16 which accumulates the time pulses and thereby indicates total elapsed time from a predetermined starting point. The time pulses typically constitute a time base of 0.01 minute or 600 milliseconds.

In accordance with the invention, the radiation counts stored in the register 13 are directed as the dividend to a counts per unit time interval division network 17. Similarly, the total elapsed time accumulated in the time storage registers 16 is directed as the divisor to the division network 17. Preferably, transfer of data from the registers 13, 16 is to similar registers in the division network 17, so that the data accumulated in the registers 13, 16 is not destroyed or altered in any way by the transfer. In this manner, the data relating to net accumulated counts and time is preserved for use in other calculations.

The division network 17 may take any form well-known in the art and without in any way departing from the spirit and scope of the basic system concept involved in the present invention. The division network 17 continuously operates upon the data received from the registers 13, 16 to continuously revise the computed count rate, and the quotient or sample count rate thus computed is directed as output over appropriate readout lines to any suitable readout equipment such as a display system 18.

In accordance with the present invention, and as one facet of the overall system concept, a relatively inexpensive and rapid, online division network for computing count rate in substantially real time, while being nondestructive of the information in the counts storage register 13 and time storage register 16 of the system shown in FIG. 1 has been discovered, and this division network is hereinafter described in connection with FIGS. 2—7 of the drawings.

Figure 2:
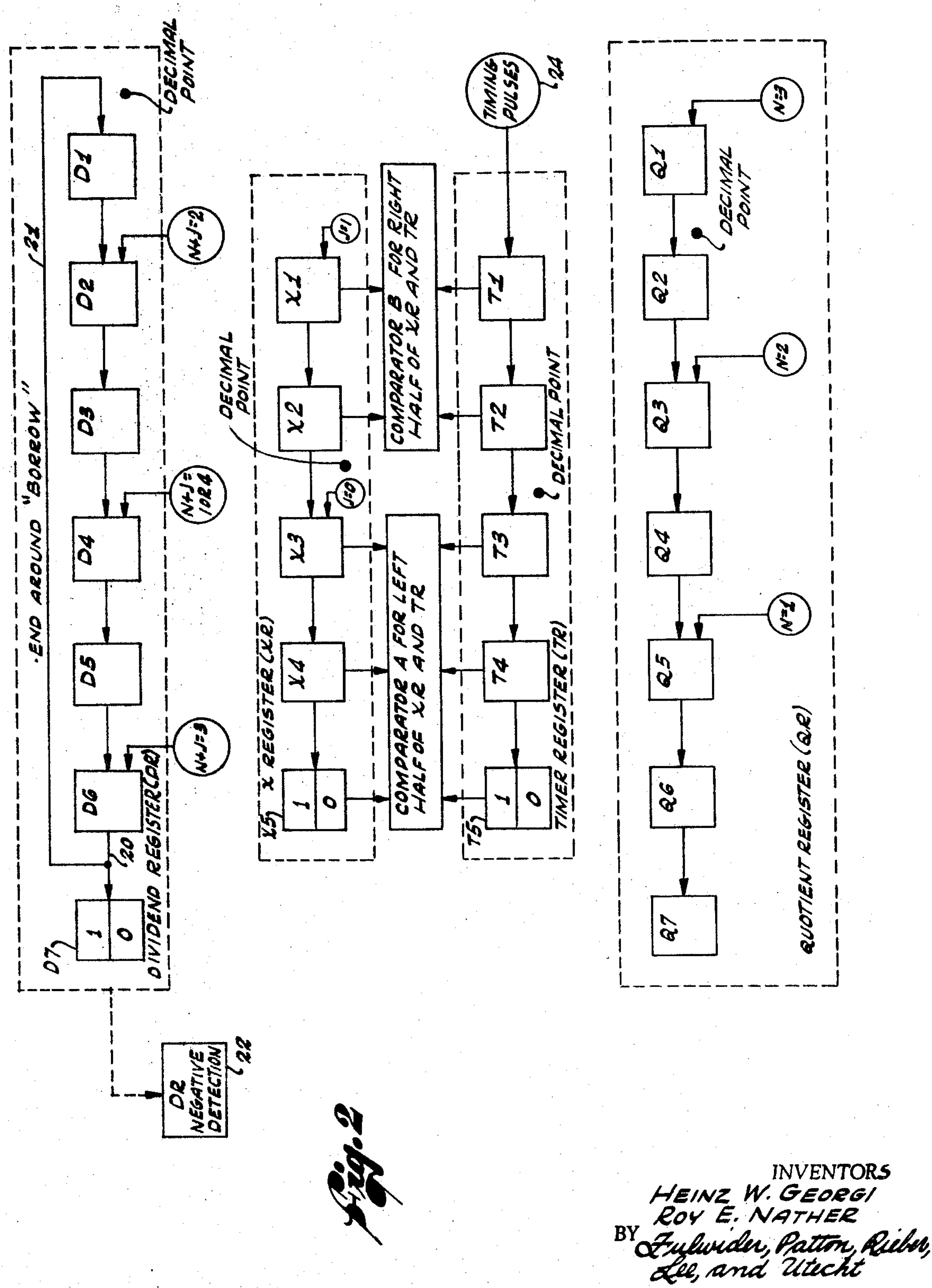
FIG. 2 is a block diagram schematic illustrating a generalized division network for computing counts per unit time interval in accordance with the invention.

The basic division network embodied by a presently preferred embodiment of the invention is illustrated in generalized block diagram form in FIG. 2. Basically, the division network includes a dividend register DR, an X register XR, a timer register TR and a quotient register QR.

The register DR includes six decades D1—D6, decade D1 normally being the decade in the least significant digit position, and a single flip-flop D7 in the most significant digit position. The dividend register DR is essentially standard in operation but is connected in a manner well known in the art so that it counts backward instead of forward, i.e., it is decremented upon receipt of a counting pulse rather than being incremented.

The carry line output 20 from the decade D6 is coupled via an end-around carrier or "borrow" line 21 to the lower order decade D1 so that, under selected conditions, the decade D6 can be used as a least significant decade and the apparent size of the dividend register DR is effectively increased. In essence, the decades D1—D6 are a backward counting ring with, as will become apparent from subsequent more detailed description in connection with FIG. 7, selective break-open points between decades so that the operation of the counting ring can be varied.

The decimal point for the dividend register DR is normally located to the right of the least significant decade D1.

A DR negative detection circuit 22 is coupled to the dividend register DR to detect the negative state of the dividend register DR whenever it has been decremented below zero value, i.e., to detect whenever the counts stored in the dividend register DR have been counted down to a negative number.

The time register TR receives timing pulses, typically of 0.01-minute duration, from a timing pulse source 24. The timer register TR includes four decades T1—T4 and a single flip-flop T5 in the most significant digit position. The decimal point in the timer register TR is located to the right of the decade T3, so that the timer can theoretically hold 199.99 minutes, although an upper practical limit of 100.00 minutes is actually imposed.

The register XR is an exact duplicate of the timer register TR. The register XR includes four decades X1—X4 and a single flip-flop X5 in the most significant digit position, the decimal point being normally located to the right of the decade X3.

The quotient register QR comprises seven decades Q1—Q7, Q1 being the least significant decade and Q7 being the most significant decade. The decimal point in the quotient register QR is located to the right of decade Q2 so that the system is capable of computing sample count rate to within 0.1 counts per minute. If desired, the quotient register QR can begin the computation phase at a state other than zero. In this connection, the nine's complement of the background count rate in counts per minute can be selectively inserted into the quotient registers QR or by any appropriate means prior to computation cycle. Therefore, as QR counts forward in measuring sample count rate, the output count rate is automatically compensated for the background count rate.

Two comparators, comparator A and comparator B continually compare the numbers in the TR and XR registers. Comparator A compares the left half of XR with the left half of TR, i.e., X3—X5 with T3—T5, whereas comparator B compares the right half of XR with the right half of TR, i.e., X1—X2 with T1—T2.

The output of comparator A determines whether counting pulses are fed to the register XR at the J=0 or J=1 input locations. Comparator B cooperates with comparator A to determine when the register XR has been counted up to equality with the timer register TR.

When J=0, counting pulses are directed as input to the register XR at decade X3, whereas J=1, counting pulses are fed as input to the decade X1.

Similarly, it will be noted that the quotient register QR has provision for receipt of tally counts at three input locations, the Q5, Q3 and Q1 decade positions corresponding to N=1, N=2 and N=3, respectively, where N is defined as a computation cycle phase counter and is used as an index reference for the computation process in a manner which will hereinafter become apparent.

The dividend register DR likewise is adapted to receive counting pulses at either of three locations, decades D6, D4, D2 corresponding to N+J=3, N+J=1 or 4, N+J=2, respectively. End around "borrow" is effective only when N+J=3 or 4.

The basic operation of the system of FIG. 2, as well as the interrelationship between the various counting pulses input positions for DR, XR and QR are next explained.

Basically, the object of the division network shown in FIG. 2 is to take the number in the dividend register DR and divide by the number held in the timer register TR, the result being tallied in the quotient register QR. Essentially, this is done by successive subtraction of the number in the timer register TR from the number in the dividend register DR. The logic questions posed is how many times the timer register TR contents can be subtracted from the dividend register DR contents before the dividend register DR goes negative? This question is posed logically over and over again under different conditions during the computation cycle.

The purpose of the register XR is to duplicate the number in the timer register TR without destroying the timer register TR contents. In general, the computation process consists of successive subtraction of the contents of the timer register TR, which is duplicated in the register XR, from whatever counts are stored in the dividend register DR, each successful subtraction, without forcing the dividend register, DR negative resulting in a single tally at an appropriate one of the several input locations in the quotient register QR.

The way in which the subtraction process is carried out is by counting down in the dividend register DR while simultaneously counting up in the register XR. Each time we successfully count the register XR up to the equality with the timer register TR, without the dividend register DR going negative, a single tally is inserted into the quotient register QR. If the dividend register DR does go negative, as detected by the DR negative detection circuit 22, in the process of counting up XR and counting down DR, no tally is inserted in the quotient register QR since a successful subtraction has not taken place.

In accordance with the present invention, electronic shifting of the counting positions in the various registers is utilized to increase the speed of the computation process, so that counting up in the register XR and counting down in the dividend register DR can be accomplished at higher order decade positions, rather than going through the slow sequential shifting process which could otherwise be necessary if counting was always accomplished through the least significant decade positions. The use of the end around "borrow" counting ring arrangement selectively in the dividend register DR whenever N+J=3 or 4, further enhances the ability of the system to accomplish counting at higher order decade positions, since the effective size of the dividend register DR is substantially increased.

By virtue of the fact that counting is accomplished at a higher order decade positions, it becomes necessary to restore the dividend register DR to its last positive remainder each time it goes negative during the computation cycle phases N=1 and 2. The need for the latter restoration will become apparent in connection with the subsequent detailed description of the computation process set forth in FIG. 4. Accomplishing such restoration by end around counting in the dividend register DR precludes having to reverse the counter and, therefore, eliminates the need for a bidirectional counting system or complementing counting. The result is considerable savings in cost because of the reduction in the complexity of the equipment which would otherwise be required.

The first input to the dividend register DR, i.e., the input to decade D4 when N+J=1, is selected Bearing leaving one extra decade over the number of XR decades at the corresponding entrance point to the register decade the latter being the J=0 input to the decade X3.

The relationship between the different input point locations between DR, XR and QR is determined by defining the standard position relative to the decimal point in DR as input to decade D1, the standard position relative to the decimal point in XR as input to decade X3, and the reference position with respect to the decimal point in QR as input to the decade Q2. With this definition, the QR left shift entry position relative to its normal reference position, hereinafter referred to as the normal decimal point position, is equal to the left shift of the DR entry point relative to its normal decimal point entry position minus the left shift of the XR entry point relative to its normal decimal point entry position. Bearing in mind that all right shifts are considered negative left shifts, and further recalling that end around borrow in DR takes place whenever N+J= 3 or 4, so that in the latter two instances decade D6 is in a −1 position and decade D4 is in a =3 position, FIG. 3 sets forth a table of the relationships between the computation cycle phase N, the values of J and N+J, and the corresponding counting and tally input positions for the dividend register DR, X register XR and quotient register QR.

Figure 4:
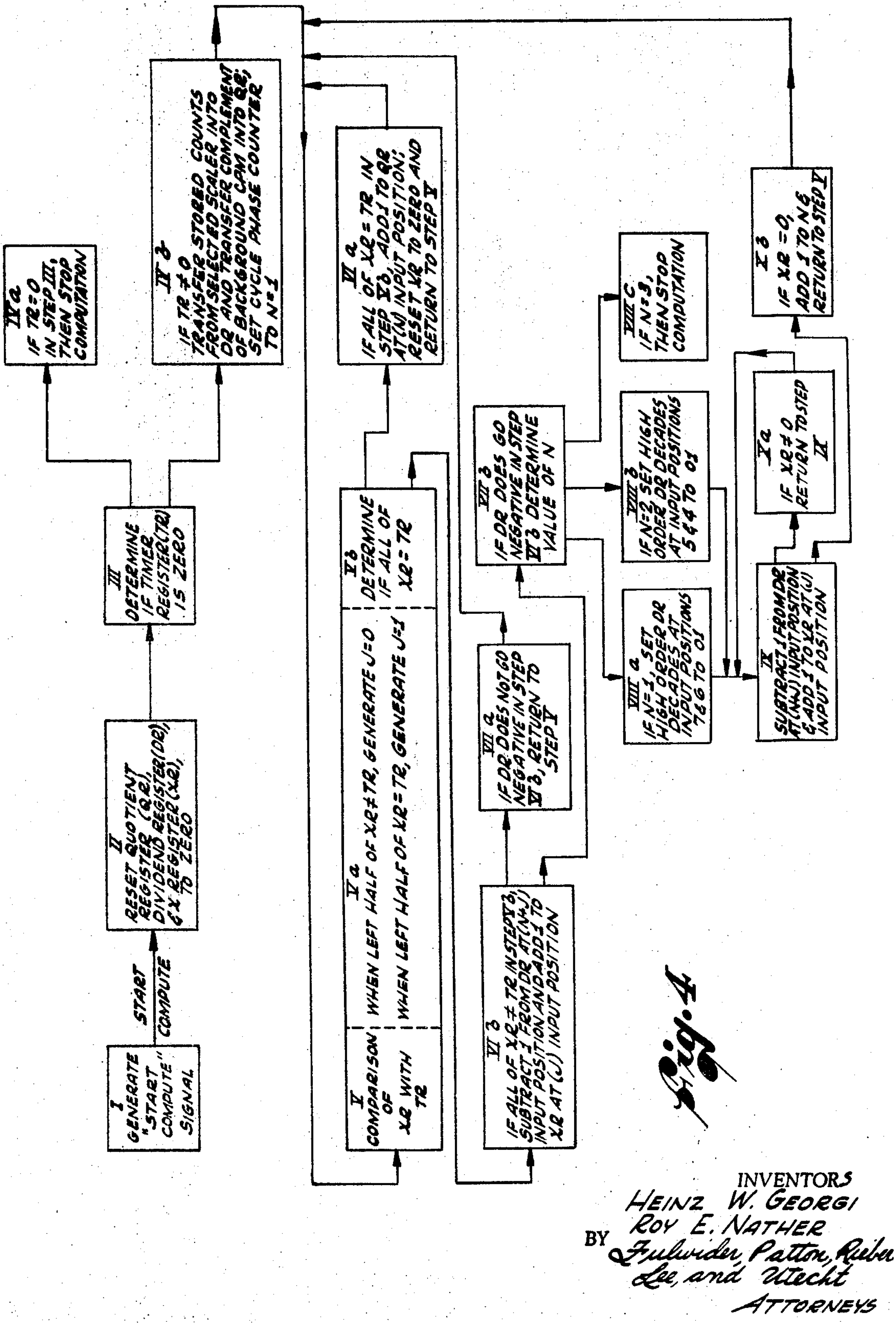
FIG. 4 is a process flow diagram for a presently preferred method of division utilized in computing sample counts per unit time interval in accordance with the invention.

Referring now more particularly to FIG. 4, the division method utilizing the apparatus of FIGS. 2 and 7 is illustrated in the form of a flow diagram.

In Step I, the "Start Compute" signal is generated the latter signal from external apparatus and being automatically generated at the beginning of each computation cycle.

In Step II, the quotient register QR dividend register DR and register XR are all reset to zero.

In Step III, the timer register TR is checked to determine whether or not the timer register TR is zero in value. The reason for Step III is that division by zero is not a defined process in arithmetic. Hence, if the accumulated time interval is zero, computation ceases at this point, and the latter constitutes Step IV*a*.

If TR is not equal to zero, then the computation can proceed and, in Step IV*b*, the stored counts are transferred from the selected scaler of the radiation counts storage register into DR and, if automatic background compensation is desired, the nine's complement of the background count rate is transferred into QR. The cycle phase counter is also set to N=1 in Step IV*b*. The cycle phase counter is merely an index counter with N successively proceeding through values 1, 2 and 3 to accomplish electronic shifting of the counting pulse entry points in the various registers during the computation cycle.

Step V involves comparison of the register XR with the timer register TR. In step V*a*, when the left half of the XR is not equal to TR, the J=0 signal is generated, whereas when the left half of XR equals TR, the J=1 signal is generated. In Step V*b*, XR is checked to see whether it has been counted up to equality with TR.

In Step VI*a*, if all of XR equals TR in Step V*b*, then a 1 is tallied in the quotient register QR at the appropriate N input position. XR is then reset to zero, and the system repeats Step V.

In Step VI*b*, noted all of XR is not equal to TR in Step V*b*, then the dividend register DR is decremented by 1 at the appropriate N+J input position, and the register XR is incremented by 1 at the appropriate J input position.

In Step VII*a*, the dividend register DR is checked to see whether or not it has gone negative in Step VI*b*, and, if DR is not negative, then Step V and VI are repeated over and over again until the dividend register DR does go negative.

If DR does go negative in Step VI*b*, then the value of N at the time DR went negative is determined in Step VII*b*.

Steps VIII*a*, VIII*b*, and VIII*c* control when DR goes negative depending upon the value of N at the time DR goes negative. If N=1 or 2 at the time DR goes negative, then Steps VIII*a* and VIII*b* initiate the process for restoring DR to its last positive remainder prior to initiation of the particular subtraction cycle which drove its negative, i.e., the value of DR at the last time XR was zero. In each such restoration process, the dividend register DR is initially set to the maximum count possible of the register XR relative to the particular point of DR entry involved for the particular computation cycle phase corresponding to the value of N.

Therefore, if N=1, the high order DR decades D7 and D6 are set respectively to 01 and in value, in accordance with Step VIII*a*. On the other hand, if N=2, then the high order DR decades D5 and D4 are set respectively to 01 and in value by Step VIII*b*. If N=3 at the time DR goes negative, then the computation cycle is over and the computation stops.

If N=1 or 2 when DR goes negative, Steps VIII*a* or VIII*b* are followed by Steps IX and X*a*, wherein the dividend register DR is successively decremented by 1 at the appropriate N+J input position, while the register XR is successively incremented by 1 at J input position until XR counts up to its maximum value of 100.00 and then switches over to zero. The switchover by XR to zero is detected in Step X*b* and marks the end of the process for restoring the dividend register Dr to its last positive remainder. At this point, Step X*b* advances the cycle phase counter by adding 1 to the value of N and then the system is returned to Step V where XR is again compared with TR. XR is then counted up again while decrementing DR at new counting pulse entry points corresponding to the new value of N.

Referring now to FIGS. 5, 6 and 7, a more specific logic arrangement is set forth for accomplishing the division method illustrated in FIG. 4.

The register arrangements in FIG. 7 essentially duplicate those in the system of FIG. 2 previously discussed with respect to DR, XR, TR and QR. Similarly XR and TR are compared by means of a comparator A and comparator B.

The output of comparator A consists of two signals COIN A and $\overline{\text{COIN A}}$, the latter signal being known in the art as "not" COIN A. $\overline{\text{COIN A}}$ in its true state is the equivalent of COIN A in the false state, i.e., they are opposite outputs from the same flip-flop, COIN A generation means that the left half of XR is equal to the left half of TR, and hence, COIN A is the J=1 signal. $\overline{\text{COIN A}}$ means that the left half of XR and TR are not equal and, therefore, $\overline{\text{COIN A}}$ is the J=0 signal.

Comparator B likewise turns out two signals, COIN B which means that the right half of XR equals the right half of TR, and $\overline{\text{COIN B}}$ which represents inequality.

In addition, a counts register CR, which is the equivalent of the counts storage register 13 in FIG. 1, is also shown in FIG. 7 adjacent the dividend register DR. Transfer of information from the counts register CR to the dividend register DR is accomplished by means of a plurality of transfer AND gates 30—36 which are enabled by a transfer pulse over the common pulse line 38 to the transfer gates. The transfer pulse over line 38 also initiates the transfer of background counts complemented from any appropriate system (denoted generally by the block 40) into the quotient register QR prior to initiation of actual count rate computation.

Referring now to FIG. 5, the negative detection system, equivalent to the DR negative detection circuit 22 in the system of FIG. 2 is described. The system shown in FIG. 5 detects DR going negative and generates the appropriate divide restore signal DVR. The signal DVR is the output from the 1 side of the flip-flop 42, the output from the 0 side of the flip-flop 42 being $\overline{\text{DVR}}$.

DVR must be generated whenever N=1 or 2 and DR become negative. Therefore, the 1 side of the flip-flop 42 is set to its true state by the output of either of two AND gates 44 or 45. AND gate 44 is enabled by the N2 signal (N=2) to pass the 0→9 pulse of decade D5 in the dividend register DR, the latter pulse being indicative of DR going negative whenever the value of N is 2. AND gate 45 sets true and is enabled by signal N1 (N=1) to pass the 0→1 pulse from the decade D7 in the dividend register DR, the latter pulse indicator DR as going negative whenever the value of N is 1.

$\overline{\text{DVR}}$ is set to its true state whenever the DR restoration process is over, and this is detected by the register XR being counted up to zero. The latter is indicated by the X5 flip-flop going from 1→0, this pulse setting the 0 side of the flip-flop 42 to generate $\overline{\text{DVR}}$.

Referring now more particularly to FIG. 6, the computation cycle phase counter and means for generating reset .and transfer pulses are described.

A "Start Compute" signal 48 from any appropriate source sets 1 side of a flip-flop 50 which generates the reset signal RES over reset lines 52. The reset lines 52 sets all of the registers XR, DR, and QR equal to zero, as indicated in both FIGS. 6 and 7.

The reset line 52 also sets the false side of flip-flops 54, 55 and 56 which are the counter flip-flops for N=1, N=2, N=3, respectively. Hence the reset line essentially sets the counter to an N=0 state defined as N not equal to 1, 2 or 3. With N=0, none of the counting impulse input gating for any of the register DR, XR or QR in FIG. 7 are enabled, and hence the reset pulse effectively prevents counting in any register during the rest phase of the computation cycle.

The true sides of flip-flops 54, 55 and 56 provide the signals N1, N2, and N3 respectively, which corresponds to states N=1, N=2, N=3, respectively, Signals N1, N2, N3 are passed through OR gate 58 to provide an output signal XGO which is utilized to enable the count pulse input gates to the register XR. The latter input gates are the AND gates 60, 61 in FIG. 7.

Similarly, the signals N1, N2 and J=as well as the J=0 and J=1 signals, enable the various dividend register DR count pulse input gates 62—64, 65—67, and 68—73 in FIG. 7.

The false or 0 side of flip-flop 50 provides the signal $\overline{RES}$. $\overline{RES}$ is set true after a few milliseconds by the reset signal RES on line 52 passing through a brief time delay circuit 75 to enable AND gate 77 so that the latter gate can pass a clock pulse to the false side of the flip-flop 50. This also serves to synch the entire system to the clock 78, since the "Start Compute" signal may not be synched.

$\overline{RES}$ can pass AND gate 80 only if $\overline{COIN\ A}$ or $\overline{COIN\ B}$ signals are generated and pass OR gate 82 to enable gate 80. Hence, $\overline{RES}$ passes gate 80 only when XR is not equal to TR. The latter precaution is necessary since XR has been set to zero by RES, and XR=TR would thus mean that TR is equal to zero. As previously indicated, the latter is a mathematically undefined condition for division and calls for termination of computation as set forth in Step IV*a* in FIG. 4.

When $\overline{RES}$ passes gate 80, it generates the transfer pulse over line 38 for the dividend register DR and quotient register QR in FIG. 7. At the same time, $\overline{RES}$ sets the true side of flip-flop 54 to generate signal N1 if, as previously indicated, TR is not equal to zero.

When N=1, at the end of the first divide restore phase to restore DR to its last positive remainder $\overline{DVR}$ goes true. $\overline{DVR}$ sets flip-flop 54 false via line 85 and sets flip-flop 55 true via AND gate 87 which is enabled by the prior N1 signal. Setting flip-flop 55 true generates the N2 signal.

When N=2, $\overline{DVR}$ sets flip-flop 55 false via AND gate 88 and sets flip-flop 56 true via AND gate 89 to generate signal N3.

When N=3, the dividend register DR going negative, as indicated by the 0→9 pulse of decade D3, sets flip-flop 56 false via AND gate 90. This effectively sets N=0 and stops the computation cycle until the next "Start Compute" signal 48.

Referring now again to FIG. 7 of the drawings, the additional gating for the dividend register DR and the quotient register QR is next explained.

AND gate 92 and OR gate 93 control the end around "borrow" from decade D6 to decade D1 so that end around counting occurs only when N=2 or 3, as indicated by the inputs to OR gate 93.

In addition, the carry between decades D5 and D6 is inhibited when N=2 by means of the AND gate 95 which is enabled by OR gate 96, the latter receiving the pair of input signals N1, N3 so that either of these signals will allow a carry between decades D5 and D6. The carry between decades D5 and D6 is inhibited when N=2 to insure than numbers encountered in normal operation will not produce a carry when N=2 and J=1.

AND gate 98 is gated by signal N1, and the pulse generated by DVR in first coming on, to set decades D7 and D6 to 01 value, as required by Step VIII*a* in FIG. 4 previously discussed. Similarly, AND gate 99 is enabled by signal N2, and pulse generated by DVR being set true, to set decades D5 and D4 to 01 value, as required by Step VIII*b* in FIG. 4.

Counting pulses are gated to the various entry points in the quotient register QR by means of AND gates 101, 102, 103 which are enabled by N1, N2, N3 respectively, together with $\overline{DVR}$ and XR=TR. Since XR=TR occurs only when comparator A and comparator B both show coincidence, XR=TR is detected by AND gate 104 which is enabled by input signals COIN A and COIN B. Hence, each time XR=TR is a successful subtraction, i.e., $\overline{DVR}$ is true indicating that the dividend register DR did not go negative, a count pulse is passed through one of the gates 101—103 to tally a 1 in the appropriate place (depending on the value of N) within the quotient register QR. Since the completion of a successful subtraction, as indicated by XR=TR and a tally in QR calls for setting XR=0, as required in Step VI*a* in FIG. 4, AND gate 105 in FIG. 7 passes a count pulse when COIN A, COIN B and $\overline{DVR}$ are all true, to reset XR=0 via reset lines 152.

Although the system of FIGS. 5—7 has been broken down, for purposes of simplicity of description into a plurality of subsystems each containing all of the logic elements necessary for performance of its respective operations, it is to be understood that, in practice and without in any way departing from the spirit and scope of the present invention, the combined system may eliminate various logic elements shown in some subsystems where the functions of such elements can be performed by similar elements in other subsystems by proper routing of electrical signals, in the interest of avoiding unnecessary duplication and redundancy of logic hardware and thereby producing a simpler and more economical arrangement.

By way of example, the operation of the system of FIGS. 4—7 described in the table below for dividing a number of counts 0132112 in the dividend register DR by a number in the timer register TR equal to 031.23 minutes. The final quotient is 004230.2 counts per minute, and the manipulations described in the table are believed to be readily comprehended in the form presented by those having ordinary skill in the art.

| Cycle phase (N) | Number in timer register (TR) | Number in X register (XR) | X register phase (J) | N+J | Number in dividend register (DR) | Number in quotient register (QR) |
|---|---|---|---|---|---|---|
| 0 | | | "START COMPUTE" | | | |
| +1 | | | | | | |
| 1 | | | | | | |
| 1 | 031. 23 | 000. 00 | 0 | 1 | 0132112 | 000000. 0 |
| 1 | 031. 23 | 001. 00 | 0 | 1 | 0131112 | 000000. 0 |
| 1 | 031. 23 | 002. 00 | 0 | 1 | 0130112 | 000000. 0 |
| . | . | . | . | . | . | . |
| . | . | . | . | . | . | . |
| . | . | . | . | . | . | . |
| 1 | 031. 23 | 031. 00 | 0→1 | 1→2 | 0101112 | 000000. 0 |
| 1 | 031. 23 | 031. 01 | 1 | 2 | 0101102 | 000000. 0 |
| 1 | 031. 23 | 031. 02 | 1 | 2 | 0101092 | 000000. 0 |
| . | . | . | . | . | . | . |
| . | . | . | . | . | . | . |
| . | . | . | . | . | . | . |
| 1 | 031. 23 | 031. 23 | 1 | 2 | 0100882 | 000000. 0 |
| | | RESET TO | | | | +1 |
| | | 000. 00 | 1→0 | 2→1 | | 001000. 0 |
| 1 | 031. 23 | 001. 00 | 0 | 1 | 0099882 | 001000. 0 |
| 1 | 031. 23 | 002. 00 | 0 | 1 | 0098882 | 001000. 0 |
| . | . | . | . | . | . | . |
| . | . | . | . | . | . | . |
| . | . | . | . | . | . | . |

| Cycle phase (N) | Number in timer register (TR) | Number in X register (XR) | X register phase (J) | N+J | Number in dividend register (DR) | Number in quotient register (QR) |
|---|---|---|---|---|---|---|
| 1 | 031.23 | 031.90 | 0→1 | 1→2 | 0069882 | 001000.0 |
| 1 | 031.23 | 031.01 | 1 | 2 | 0069872 | 001000.0 |
| ⋮ | ⋮ | ⋮ | ⋮ | ⋮ | ⋮ | ⋮ |
| 1 | 031.23 | 031.23 | 1 | 2 | 0069652 | 001000.0 |
| | | RESET TO | | | | +1 |
| | | 000.00 | 1→0 | 2→1 | | 002000.0 |
| 1 | 031.23 | 001.00 | 0 | 1 | 0068652 | 002000.0 |
| 1 | 031.23 | 002.00 | 0 | 1 | 0067652 | 002000.0 |
| 1 | 031.23 | 031.00 | 0→1 | 1→2 | 0038652 | 002000.0 |
| 1 | 031.23 | 031.01 | 1 | 2 | 0038642 | 002000.0 |
| ⋮ | ⋮ | ⋮ | ⋮ | ⋮ | ⋮ | ⋮ |
| 1 | 031.23 | 031.23 | 1 | 2 | 0038422 | 002000.0 |
| | | RESET TO | | | | +1 |
| | | 000.00 | 1→0 | 2→1 | | 003000.0 |
| 1 | 031.23 | 001.00 | 0 | 1 | 0037422 | 003000.0 |
| ⋮ | ⋮ | ⋮ | ⋮ | ⋮ | ⋮ | ⋮ |
| 1 | 031.23 | 031.00 | 0→1 | 1→2 | 0007422 | 003000.0 |
| 1 | 031.23 | 031.01 | 1 | 2 | 0007412 | 003000.0 |
| ⋮ | ⋮ | ⋮ | ⋮ | ⋮ | ⋮ | ⋮ |
| 1 | 031.23 | 031.23 | 1 | 2 | 0007192 | 003000.0 |
| | | RESET TO | | | | +1 |
| | | 000.00 | 1→0 | 2→1 | | 004000.0 |
| 1 | 031.23 | 001.00 | 0 | 1 | 0006192 | 004000.0 |
| ⋮ | ⋮ | ⋮ | ⋮ | ⋮ | ⋮ | ⋮ |
| 1 | 031.23 | 007.00 | 0 | 1 | 0000192 | 004000.0 |
| 1 | 031.23 | 008.00 | 0 | 1 | 1999192 | 004000.0 |
| | | | | | DR NEGATIVE—D7, 0→1 | |
| | DVR TRUE—BEGIN DR REMAINDER RESTORATION | | | | RESET DR TO | |
| 1 | 031.23 | 008.00 | 0 | 1 | 0199192 | 004000.0 |
| 1 | 031.23 | 009.00 | 0 | 1 | 0198192 | 004000.0 |
| ⋮ | ⋮ | ⋮ | ⋮ | ⋮ | ⋮ | ⋮ |
| 1 | 031.23 | 031.00 | 0→1 | 1→2 | 0168192 | 004000.0 |
| 1 | 031.23 | 031.01 | 1 | 2 | 0168182 | 004000.0 |
| 1 | 031.23 | 031.02 | 1 | 2 | 0168172 | 004000.0 |
| ⋮ | ⋮ | ⋮ | ⋮ | ⋮ | ⋮ | ⋮ |
| 1 | 031.23 | 031.23 | 1 | 2 | 0167962 | 004000.0 |
| | | NO RESET | | | | |
| ⋮ | ⋮ | ⋮ | ⋮ | ⋮ | ⋮ | ⋮ |
| 1 | 031.23 | 031.99 | 1 | 2 | 0167202 | 004000.0 |
| 1 | 031.23 | 032.00 | 1→0 | 2→1 | 0167192 | 004000.0 |
| 1 | 031.23 | 033.00 | 0 | 1 | 0166192 | 004000.0 |
| ⋮ | ⋮ | ⋮ | ⋮ | ⋮ | ⋮ | ⋮ |
| 1 | 031.23 | 199.00 | 0 | 1 | 0008192 | 004000.0 |
| 1 | 031.23 | 000.00 | 0 | 1 | 0007192 | 004000.0 |
| | | $\overline{\text{DVR}}$ TRUE—DR REMAINDER RESTORED | | | | |
| +1 | | | | | | |
| 2 | | | | | | |
| 2 | 031.23 | 001.00 | 0 | 2 | 0007182 | 004000.0 |
| ⋮ | ⋮ | ⋮ | ⋮ | ⋮ | ⋮ | ⋮ |
| 2 | 031.23 | 031.00 | 0→1 | 2→3 | 0006882 | 004000.0 |
| 2 | 031.23 | 031.01 | 1 | 3 | 0906881 | 004000.0 |
| | | | | | END AROUND BORROW | |

| Cycle phase (N) | Number in timer register (TR) | Number in X register (XR) | X register phase (J) | N+J | Number in dividend register (DR) | Number in quotient register (QR) |
|---|---|---|---|---|---|---|
| ⋮ | ⋮ | ⋮ | ⋮ | ⋮ | ⋮ | ⋮ |
| 2 | 031.23 | 031.23 | 1 | 3 | 0706879 | 004000.0 |
| | | RESET TO | | | | +1 |
| | | 000.00 | 1→0 | 3→2 | | 004010.0 |
| 2 | 031.23 | 001.00 | 0 | 2 | 0706869 | 004010.0 |
| ⋮ | ⋮ | ⋮ | ⋮ | ⋮ | ⋮ | ⋮ |
| 2 | 031.23 | 031.00 | 0→1 | 2→3 | 0706569 | 004010.0 |
| 2 | 031.23 | 031.01 | 1 | 3 | 0606569 | 004010.0 |
| ⋮ | ⋮ | ⋮ | ⋮ | ⋮ | ⋮ | ⋮ |
| 2 | 031.23 | 031.23 | 1 | 3 | 0406567 | 004010.0 |
| | | RESET TO | | | | +1 |
| | | 000.00 | 1→0 | 3→2 | | 004020.0 |
| 2 | 031.23 | 001.00 | 0 | 2 | 0406557 | 004020.0 |
| ⋮ | ⋮ | ⋮ | ⋮ | ⋮ | ⋮ | ⋮ |
| 2 | 031.23 | 031.00 | 0→1 | 2→3 | 0406257 | 004020.0 |
| 2 | 031.23 | 031.01 | 1 | 3 | 0306257 | 004020.0 |
| ⋮ | ⋮ | ⋮ | ⋮ | ⋮ | ⋮ | ⋮ |
| 2 | 031.23 | 031.23 | 1 | 3 | 0106255 | 004020.0 |
| | | RESET TO | | | | +1 |
| | | 000.00 | 1→0 | 3→2 | | 004030.0 |
| 2 | 031.23 | 001.00 | 0 | 2 | 0106245 | 004030.0 |
| ⋮ | ⋮ | ⋮ | ⋮ | ⋮ | ⋮ | ⋮ |
| 2 | 031.23 | 031.00 | 0→1 | 2→3 | 0105945 | 004030.0 |
| ⋮ | ⋮ | ⋮ | ⋮ | ⋮ | ⋮ | ⋮ |
| 2 | 031.23 | 031.23 | 1 | 3 | 0805942 | 004030.0 |
| | | RESET TO | | | | +1 |
| | | 000.00 | 1 → 0 | 3 → 2 | | 004040.0 |
| ⋮ | ⋮ | ⋮ | ⋮ | ⋮ | ⋮ | ⋮ |
| 2 | 031.23 | 031.00 | 0 → 1 | 2 → 3 | 0805632 | 004040.0 |
| ⋮ | ⋮ | ⋮ | ⋮ | ⋮ | ⋮ | ⋮ |
| 2 | 031.23 | 031.23 | 1 | 3 | 0505630 | 004040.0 |
| | | RESET TO | | | | +1 |
| | | 000.00 | 1 → 0 | 3 → 2 | | 004050.0 |
| ⋮ | ⋮ | ⋮ | ⋮ | ⋮ | ⋮ | ⋮ |
| 2 | 031.23 | 031.00 | 0 → 1 | 2 → 3 | 0505320 | 004050.0 |
| ⋮ | ⋮ | ⋮ | ⋮ | ⋮ | ⋮ | ⋮ |
| 2 | 031.23 | 031.23 | 1 | 3 | 0205318 | 004050.0 |
| | | RESET TO | | | | +1 |
| | | 000.00 | 1→0 | 3→2 | | 004060.0 |
| ⋮ | ⋮ | ⋮ | ⋮ | ⋮ | ⋮ | ⋮ |
| ETC. FOR 14 SIMILAR CYCLES EACH TERMINATING IN QR+1 | | | | | | |
| 2 | 031.23 | 031.23 | 1 | 3 | 0700633 | 004200.0 |
| | | RESET TO | | | | +1 |
| | | 000.00 | 1→0 | 3→2 | | 004210.0 |

| Cycle phase (N) | Number in timer register (TR) | Number in X register (XR) | X register phase (J) | N+J | Number in dividend register (DR) | Number in quotient register (QR) |
|---|---|---|---|---|---|---|
| ⋮ | ⋮ | ⋮ | ⋮ | ⋮ | ⋮ | ⋮ |
| 2 | 031.23 | 031.00 | 0→1 | 2→3 | 0700323 | 004210.0 |
| ⋮ | ⋮ | ⋮ | ⋮ | ⋮ | ⋮ | ⋮ |
| 2 | 031.23 | 031.23 | 1 | 3 | 0400321 | 004210.0 |
| | | RESET TO | | | | +1 |
| | | 000.00 | 1→0 | 3→2 | | 004220.0 |
| ⋮ | ⋮ | ⋮ | ⋮ | ⋮ | ⋮ | ⋮ |
| 2 | 031.23 | 031.00 | 0→1 | 2→3 | 0400011 | 004220.0 |
| ⋮ | ⋮ | ⋮ | ⋮ | ⋮ | ⋮ | ⋮ |
| 2 | 031.23 | 031.23 | 1 | 3 | 0100009 | 004220.0 |
| | | RESET TO | | | | +1 |
| | | 000.00 | 1→0 | 3→2 | | 004230.0 |
| 2 | 031.23 | 001.00 | 0 | 2 | 0199999 | 004230.0 |
| | | | | | DR NEGATIVE—D5, 0→9 | |
| | DVR TRUE—BEGIN DR REMAINDER RESTORATION | | | | | |
| | | | | | RESET DR TO | |
| 2 | 031.23 | 001.00 | 0 | 2 | 0101999 | 004230.0 |
| 2 | 031.23 | 002.00 | 0 | 2 | 0101989 | 004230.0 |
| ⋮ | ⋮ | ⋮ | ⋮ | ⋮ | ⋮ | ⋮ |
| 2 | 031.23 | 031.00 | 0→1 | 2→3 | 0101699 | 004230.0 |
| 2 | 031.23 | 031.01 | 1 | 3 | 0001699 | 004230.0 |
| 2 | 031.23 | 031.02 | 1 | 3 | 0901698 | 004230.0 |
| ⋮ | ⋮ | ⋮ | ⋮ | ⋮ | ⋮ | ⋮ |
| 2 | 031.23 | 031.99 | 1 | 3 | 0201689 | 004230.0 |
| 2 | 031.23 | 032.00 | 1→0 | 3→2 | 0101689 | 004230.0 |
| 2 | 031.23 | 033.00 | 0 | 2 | 0101679 | 004230.0 |
| ⋮ | ⋮ | ⋮ | ⋮ | ⋮ | ⋮ | ⋮ |
| 2 | 031.23 | 199.00 | 0 | 2 | 0100019 | 004230.0 |
| 2 | 031.23 | 000.00 | 0 | 2 | 0100009 | 004230.0 |
| +1 | | $\overline{\text{DVR}}$ TRUE—DR REMAINDER RESTORED | | | | |
| 3 | | | | | | |
| 3 | 031.23 | 001.00 | 0 | 3 | 0000009 | 004230.0 |
| ⋮ | ⋮ | ⋮ | ⋮ | ⋮ | ⋮ | ⋮ |
| 3 | 031.23 | 031.00 | 0→1 | 3→4 | 0000006 | 004230.0 |
| 3 | 031.23 | 031.01 | 1 | 4 | 0999005 | 004230.0 |
| ⋮ | ⋮ | ⋮ | ⋮ | ⋮ | ⋮ | ⋮ |
| 3 | 031.23 | 031.23 | 1 | 4 | 0977005 | 004230.0 |
| | | Reset to | | | | +1 |
| | | 000.00 | 1→0 | 4→3 | | 004230.1 |
| 3 | 031.23 | 001.00 | 0 | 3 | 0877005 | 004230.1 |
| ⋮ | ⋮ | ⋮ | ⋮ | ⋮ | ⋮ | ⋮ |
| 3 | 031.23 | 031.00 | 0→1 | 3→4 | 0877002 | 004230.1 |
| 3 | 031.23 | 031.01 | 1 | 4 | 0876002 | 004230.1 |
| ⋮ | ⋮ | ⋮ | ⋮ | ⋮ | ⋮ | ⋮ |
| 3 | 031.23 | 031.23 | 1 | 4 | 0854002 | 004230.1 |
| | | Reset to | | | | +1 |
| | | 000.00 | 1→0 | 4→3 | | 004230.2 |
| 3 | 031.23 | 001.00 | 0 | 3 | 0754002 | 004230.2 |
| ⋮ | ⋮ | ⋮ | ⋮ | ⋮ | ⋮ | ⋮ |

| Cycle phase (N) | Number in timer register (TR) | Number in X register (XR) | X register phase (J) | N+J | Number in dividend register (DR) | Number in quotient register (QR) |
|---|---|---|---|---|---|---|
| . | . | . | . | . | . | . |
| . | . | . | . | . | . | . |
| 3 | 031.23 | 028.00 | 0 | 3 | 0054000 | 004230.2 |
| 3 | 031.23 | 029.00 | 0 | 3 | 1954999 | 004230.2 |
| | | | | | DR NEGATIVE—D3, 0→9 | |
| 0 | 031.23 | 029.00 | 0 | ........ | 1954999 | 004230.2 |
| | | | | | | ↓ READ OUT FROM QR |

The aforedescribed radiation detection system with automatic simple count rate determination satisfies a long existing need in the art for an online system capable of automatically computing in substantially real time and continuously presenting sample count rates to a system operator.

It will be apparent from the foregoing that, while particular forms of the invention have been illustrated and described, various modifications can be made without departing from the spirit and scope of the invention.

We claim:

1. A radiation analysis system, comprising:
detection means for detecting radiation from a radioactive sample;
counting means connected to said detection means for registering the decay events occuring in said sample and detected by said detection means during an elapsed detection time interval;
timing means for counting up the time elapsed during said detection time interval;
and division means connected to said timing means and said counting means for automatically dividing the counts registered by said counting means by said time elapsed as measured by said timing means, whereby sample count rate is automatically determined.

2. A radiation analysis system as set forth in claim 1, including means for automatically compensating the sample count rate computed by said division means for background count rate.

3. A radiation analysis system as set forth in claim 1, including readout means connected to the output of said division means.

4. A system as set forth in claim 3, wherein said readout means includes display means for continuously indicating the sample count rate computed by said division means.

5. A radiation analysis system, comprising:
detection means for detecting radiation from a radioactive sample;
pulse counting registering means for registering the decay events occuring in said sample and detected by said detection means during an elapsed detection time interval;
timer register means for counting up the time elapsed during said detection time interval; and
division means for automatically continuously and nondestructively dividing the counts registered by said counting register means by said time elapsed as registered by said timer register means, whereby sample count rate is automatically and continuously determined on line without affecting the stored information regarding elapsed detection time and total decay events detected during said elapsed time period.

6. A radiation analysis system as set forth in claim 5, including means for automatically compensating the sample count rate computed by said division means for background count rate.

7. A system as set forth in claim 5, wherein said division means includes:
a backward counting dividend register means having a plurality of decades;
a transfer means for nondestructively transferring all of the count information in said counting register means to said dividend register means;
a second timer register means which is forward counting, said second timer register means having the same decade arrangement as said first timer register means;
a quotient register means which is forward counting, said quotient register means having a plurality of decades;
first means for simultaneously decrementing said dividend register means while incrementing said second timer register means until said second timer register means registers the same number as said first timer register means, and
second means for resetting said second timer register means to zero when said first timer register means and said second timer register means are equal, and to tally a 1 in said quotient register means only if said dividend register means has not gone negative.

8. A system as set forth in claim 7, wherein said backward counting dividend register means is a backward counting ring circuit configuration for enabling end around counting from a higher order decade to a lower order decade.

9. A system as set forth in claim 7 and further including:
third means, responsive to said dividend register means going negative, for restoring the number in said dividend register means to the last positive remainder which existed when said second timer register means is zero in value; and
fourth means for automatically shifting incrementing and decrementing to higher and lower order decades in said dividend register means and said second timer register means while preserving proper decade tally positions in said quotient register means to compensate for said shifting.

10 In a radiation analysis system for automatically computing online sample counting rate activity, the combination comprising:
a backward counting dividend register having a plurality of decades, said decades being connected in a ring configuration facilitating selective end around counting from normally higher decades to normally lower order decades;
means for selectively inserting into said dividend register a number corresponding to the number of sample counts measured during an elapsed detection time interval;
means for detecting the negative state of said dividend register;
a first forward counting timer register for counting up the time elapsed during said detection time interval, said first timer register having a plurality of decades;
a second forward counting timer register, said second timer register having the same decade arrangement as said first timer register;
comparator means for comparing the number in said second timer register with the number in said first timer register as said second timer register is counted up;
a forward counting quotient register, said quotient register having a plurality of decades;
means for simultaneously decrementing said dividend register while incrementing said second timer register until said comparator means indicates that the numbers in said first timer register and said second timer register are the same;
means for resetting said second timer register to zero when said comparator means indicates that the numbers in said first timer register and said second timer register are the same, and to tally a 1 in said quotient register, provided said divided register has not gone negative as indicated by said means for detecting the negative state of said dividend register;

means responsive to said dividend register going negative for restoring the number in said dividend register to the last positive remainder which existed when said second timer register was in its last zero state;

means for automatically shifting the incrementing and decrementing of said dividend register and said second timer register to higher and lower order decades while simultaneously preserving the proper tally position in said quotient register to compensate for such shifting in said dividend and said second timer registers; and readout means coupled to said quotient register for continuously indicating the sample count rate computed.

11. A combination as set forth in claim 10, including means for selectively inserting the complement of background count rate into said quotient register prior to initiation of any incrementing of said second timer register and decrementing of said dividend register, whereby the sample count rate computed is automatically compensated for background count rate.